US011110849B1

(12) United States Patent
Alterie

(10) Patent No.: US 11,110,849 B1
(45) Date of Patent: Sep. 7, 2021

(54) LOAD SECURING DEVICE

(71) Applicant: Allen Alterie, Willsboro, NY (US)

(72) Inventor: Allen Alterie, Willsboro, NY (US)

(*) Notice: Subject to any disclaimer, the term of this patent is extended or adjusted under 35 U.S.C. 154(b) by 0 days.

(21) Appl. No.: 16/811,545

(22) Filed: Mar. 6, 2020

Related U.S. Application Data

(60) Provisional application No. 62/815,024, filed on Mar. 7, 2019.

(51) Int. Cl.
*B60P 7/08* (2006.01)

(52) U.S. Cl.
CPC .................. *B60P 7/083* (2013.01)

(58) Field of Classification Search
CPC ..... B61D 45/001; B61D 45/008; B60P 7/083; B60P 7/0823; F16G 11/00; F16G 11/12; F16G 15/00
USPC ........ 410/96–100, 34, 12; 24/68 CT, 68 CD; 254/233, 234, 235, 237; 403/202, 43, 44, 403/45
See application file for complete search history.

(56) References Cited

U.S. PATENT DOCUMENTS

| | | | | | |
|---|---|---|---|---|---|
| 217,091 | A | * | 7/1879 | Gracey | F16G 11/12 254/236 |
| 301,940 | A | * | 7/1884 | Wall | B65B 13/025 254/234 |
| 310,767 | A | * | 1/1885 | Wilson | F16G 11/12 254/235 |
| 1,037,615 | A | * | 9/1912 | Grenier | F16G 3/006 254/232 |
| 2,220,288 | A | * | 11/1940 | Sarosdy | F16D 41/16 254/232 |
| 2,403,512 | A | * | 7/1946 | Flesch | F16G 11/12 403/19 |
| 2,673,632 | A | * | 3/1954 | Stiranka | F16G 11/12 192/43.1 |
| 2,848,259 | A | * | 8/1958 | Huber | B60P 3/073 403/46 |
| 2,908,474 | A | * | 10/1959 | Chiarito | B60P 7/10 410/32 |
| 3,051,519 | A | * | 8/1962 | Sudeikis | F16G 15/00 403/43 |
| 3,056,480 | A | * | 10/1962 | Carroll | B66D 3/14 192/16 |
| 3,065,007 | A | * | 11/1962 | Colmer, Jr. | F16G 11/12 403/45 |
| 3,338,359 | A | * | 8/1967 | Baillie | B63B 25/24 192/43.1 |
| 3,459,156 | A | * | 8/1969 | Harter | F16G 11/00 118/405 |

(Continued)

FOREIGN PATENT DOCUMENTS

DE 202016006553 U1 * 11/2016 ............. F16G 11/12

*Primary Examiner* — Hilary L Gutman
(74) *Attorney, Agent, or Firm* — Cramer Patent & Design, PLLC.; Aaron R. Cramer

(57) ABSTRACT

A load securing device includes a lever binder used with chains or a similar fastener. The binder includes a sealed bearing, a shock cover, and ergonomic operational handles. The load securing device includes a first draw bolt and a second draw bolt that extends away from opposing sides of the bearing and are thus linearly arranged with respect to each other. The bearing is sealed to prevent rust or binding of the ratchet device with environmental debris.

6 Claims, 3 Drawing Sheets

(56) References Cited

U.S. PATENT DOCUMENTS

| | | | | |
|---|---|---|---|---|
| 4,100,875 | A * | 7/1978 | Patterson, III | B63B 21/00 114/251 |
| 4,130,269 | A * | 12/1978 | Schreyer | F16G 11/12 24/19 |
| 4,573,842 | A | 3/1986 | Mantela et al. | |
| 4,830,339 | A * | 5/1989 | McGee | F16G 11/12 254/235 |
| 5,911,409 | A * | 6/1999 | Grover | B25B 21/002 254/234 |
| 6,761,094 | B2 * | 7/2004 | Tobako | B25G 1/043 403/328 |
| 6,945,516 | B1 * | 9/2005 | Scott | B60P 7/083 254/231 |
| 7,063,483 | B1 * | 6/2006 | Krenzler | E02B 3/06 405/25 |
| 7,451,962 | B1 * | 11/2008 | Kennedy | F16B 7/06 254/231 |
| 7,552,913 | B1 * | 6/2009 | Amoss | F16G 11/12 254/233 |
| 7,594,786 | B2 | 9/2009 | Scott | |
| 7,634,841 | B2 | 12/2009 | Profit | |
| 8,851,255 | B2 | 10/2014 | Mitchell | |
| 9,340,144 | B1 | 5/2016 | Sarnowski | |
| D772,032 | S * | 11/2016 | Durbin | D8/44 |
| 9,527,424 | B1 | 12/2016 | Sarnowski | |
| 9,610,885 | B2 | 4/2017 | Williams | |
| 9,884,581 | B1 | 2/2018 | Royt | |
| 10,029,604 | B2 | 7/2018 | Brewster et al. | |
| 10,035,452 | B2 | 7/2018 | Hill | |
| 10,308,163 | B2 * | 6/2019 | Helline | B60P 7/0853 |
| 10,464,467 | B2 * | 11/2019 | Robins | B60P 7/0853 |
| 10,752,156 | B2 * | 8/2020 | Ruan | B60P 7/083 |
| 10,814,773 | B1 * | 10/2020 | Rainone | B60P 7/083 |
| 2004/0037665 | A1 * | 2/2004 | Im | B60P 7/0853 410/103 |
| 2006/0005355 | A1 * | 1/2006 | Wallis | E05D 7/0027 16/237 |
| 2008/0118324 | A1 | 5/2008 | Fritel | |
| 2008/0314372 | A1 * | 12/2008 | Guindon | B60P 7/0853 124/5 |
| 2011/0038682 | A1 * | 2/2011 | Cencer | B60P 3/08 410/20 |
| 2014/0060513 | A1 * | 3/2014 | Tulpa | F41B 5/1449 124/86 |
| 2014/0109361 | A1 * | 4/2014 | Helline | B60P 7/083 24/68 CD |
| 2014/0326935 | A1 * | 11/2014 | Chao | B60P 7/083 254/235 |
| 2016/0195165 | A1 * | 7/2016 | Chou | F16H 25/20 74/88 |
| 2017/0232881 | A1 * | 8/2017 | Thompson | B60P 7/0853 254/229 |
| 2017/0355298 | A1 * | 12/2017 | Cahall | F16H 57/021 |
| 2019/0351809 | A1 * | 11/2019 | Liu | B60P 7/083 |
| 2020/0062165 | A1 * | 2/2020 | Wang | F16G 11/12 |
| 2020/0362942 | A1 * | 11/2020 | Martens | F16G 11/12 |

* cited by examiner

LOAD SECURING DEVICE

RELATED APPLICATIONS

The present invention claims the benefit of U.S. Provisional Application No. 62/815,024, filed Mar. 7, 2019, the entire disclosures of which are incorporated herein by reference.

FIELD OF THE INVENTION

The presently disclosed subject matter is directed to a load securing device.

BACKGROUND OF THE INVENTION

There are countless tractor-trailer trucks that crisscross our country every day. These large vehicles bring just about every object we touch in our daily lives to use. One type of trailer commonly used with large or bulky objects such as PVC pipe, metal pipe, large tubing, logs, and the like is the flatbed trailer. Such a trailer does not only a great job of transporting such bulky loads but allows access to all three sides of the trailer for loading and unloading purposes. Such trailers and loads often use chains with a lever binder to hold such loads during transit.

While lever binders have been used for generations, they are not without their faults. Their simple hinges can easily become bound up with rust making them difficult to open or close. Dirt and other contaminants can enter the mechanism not only making them hard to use, but perhaps even allowing them to open during use. Finally, their metal handles can be painful to use should rust dings and scrapes cause sharp edges. Accordingly, there exists a need for a means by which lever binders can be used on flatbed trailers in a manner which addresses the disadvantages as described above. The development of the load securing device fulfills this need.

SUMMARY OF THE INVENTION

The principles of the present invention provide for a load securing device, comprising a handle and a ratchet device capable of incrementally operably retracting a first draw bolt and a second draw bolt towards each other. The ratchet device is also engaged by the handle. The load securing device also comprises an enclosed bearing housing the ratchet device and a first grease fitting located on the first draw bolt to provide enablement of introducing a first grease to the bearing to encourage friction-free movement, a second grease fitting located on the second draw bolt, respectively, to provide enablement of introducing a second grease to the bearing to encourage friction-free movement, a yoke which is attached to the housing of the bearing and is oriented perpendicular to the first draw bolt and second draw bolt, a handle pivot which affixes the plates together and is located at an opposing side of the yoke to the bearing, a first eye bolt which is attached to the second side of the first draw bolt opposite the bearing, an articulating first cover which is disposed between the first end of the bearing and the first eyebolt, a first buckle removably attaching a first hook to the first eyebolt, the first hook and the first eyebolt travels with the first draw bolt and a second buckle removably attaching a second hook to the second eyebolt. The second hook and the second eyebolt travels with the second draw bolt.

The handle may operably connected to a first end of the ratchet device and incrementally actuates the ratchet device so as to simultaneously retract the first draw bolt towards the bearing and to retract the second draw bolt towards the bearing. The handle may extend outward from in between the two plates of the yoke and is operably attached to the handle pivot. The first draw bolt may have a first end operably connected to a first end of the ratchet device within the bearing while the second draw bolt may have a first end operably connected to a second end of the ratchet device within the bearing.

The first draw bolt and the second draw bolt may extend away from opposing sides of the bearing and are thus linearly arranged with respect to each other. The first draw bolt may extend in and out of the first side of the bearing and may be actuated by the ratchet device.

The bearing may be sealed to prevent rust or binding of the ratchet device with environmental debris. The yoke may generally be two coextensive planar elements with a gap in the middle. The first draw bolt may be extended away from the bearing to a position that the first hook is secured into a link of a chain. The load securing device may be securely connected to the chain that securely wraps around the load secured at the first side or the second side of the bearing. The handle pivot may be operably attached to the ratchet device in between the two plates of the yoke adjacent the bearing. The handle may be motionable about the handle pivot to operate the ratchet device and may be available to be motioned towards either side, relative to the yoke, due to how the load securing device is installed.

The articulating first cover may be made of rubber. The articulating first cover may extend out of the first end of the bearing and prevent debris from entering the bearing. The load securing device may secure a load onto a towing vehicle. The towing vehicle may be a vehicle which is selected from the group consisting of a trailer that is not enclosed, a flatbed truck, or a gooseneck trailer. The load securing device may be manufactured out of a forged metallic material for strength and resiliency. The load securing device may be coated or treated with a protective material to resist rusting and damage from the environment. The protective coating may also provide for an enhanced grip when being manipulated.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
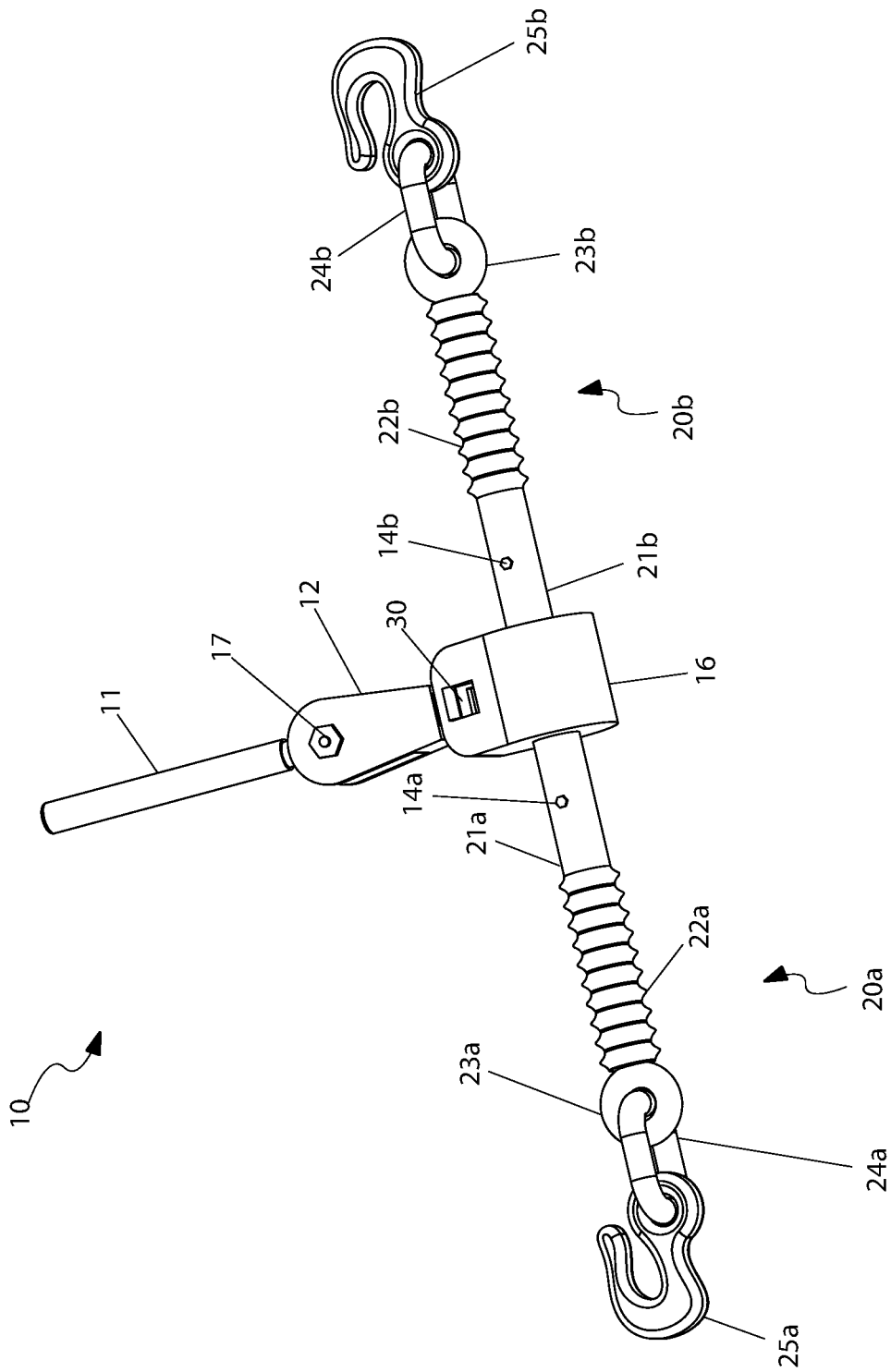
FIG. 1 is a top perspective view of a load securing device 10 in a first configuration, according to the preferred embodiment of the present invention.

DESCRIPTIVE KEY 10 load securing device
11 handle
12 yoke
14a first grease fitting
14b second grease fitting
16 bearing
17 handle pivot 20a first side
20b second side
21a first draw bolt
21b second draw bolt
22a first cover
22b second cover
23a first eyebolt
23b second eyebolt
24a first buckle
24b second buckle
25a first hook
25b second hook
30 locking lever
40 frame
41 tie-down location
42 vehicle
45 chain
50 load

DESCRIPTION OF THE INVENTION

Figure 2:
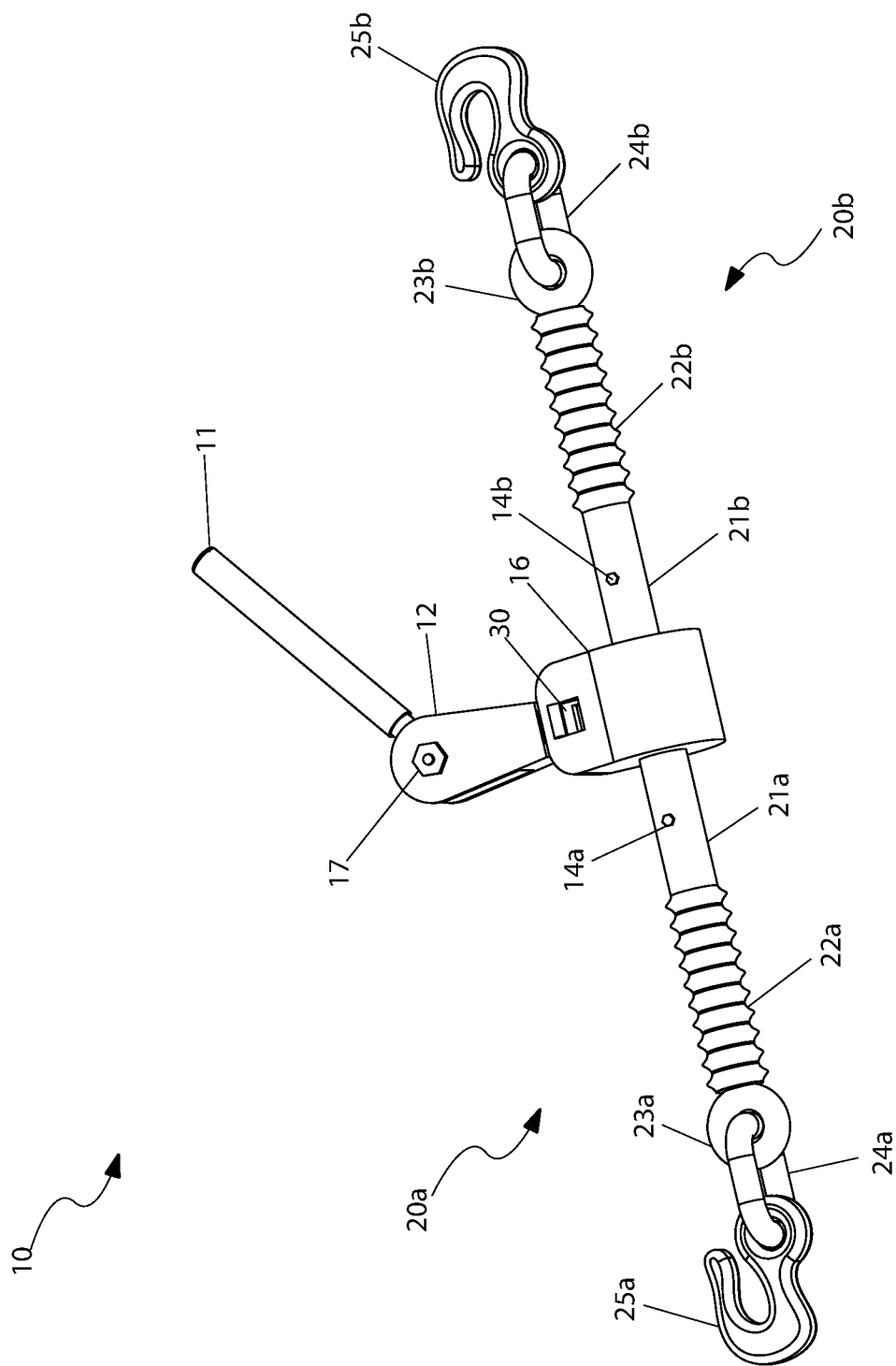
FIG. 2 is a top perspective view of the load securing device 10 in a second configuration, according to the preferred embodiment of the present invention; and, FIG. 3 is an environmental view of the load securing device 10 in a second configuration, according to the preferred embodiment of the present invention.

The best mode for carrying out the invention is presented in terms of its preferred embodiment, herein depicted within FIGS. 1 and 2. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

DETAILED DESCRIPTION OF THE FIGURES

Figure 3:
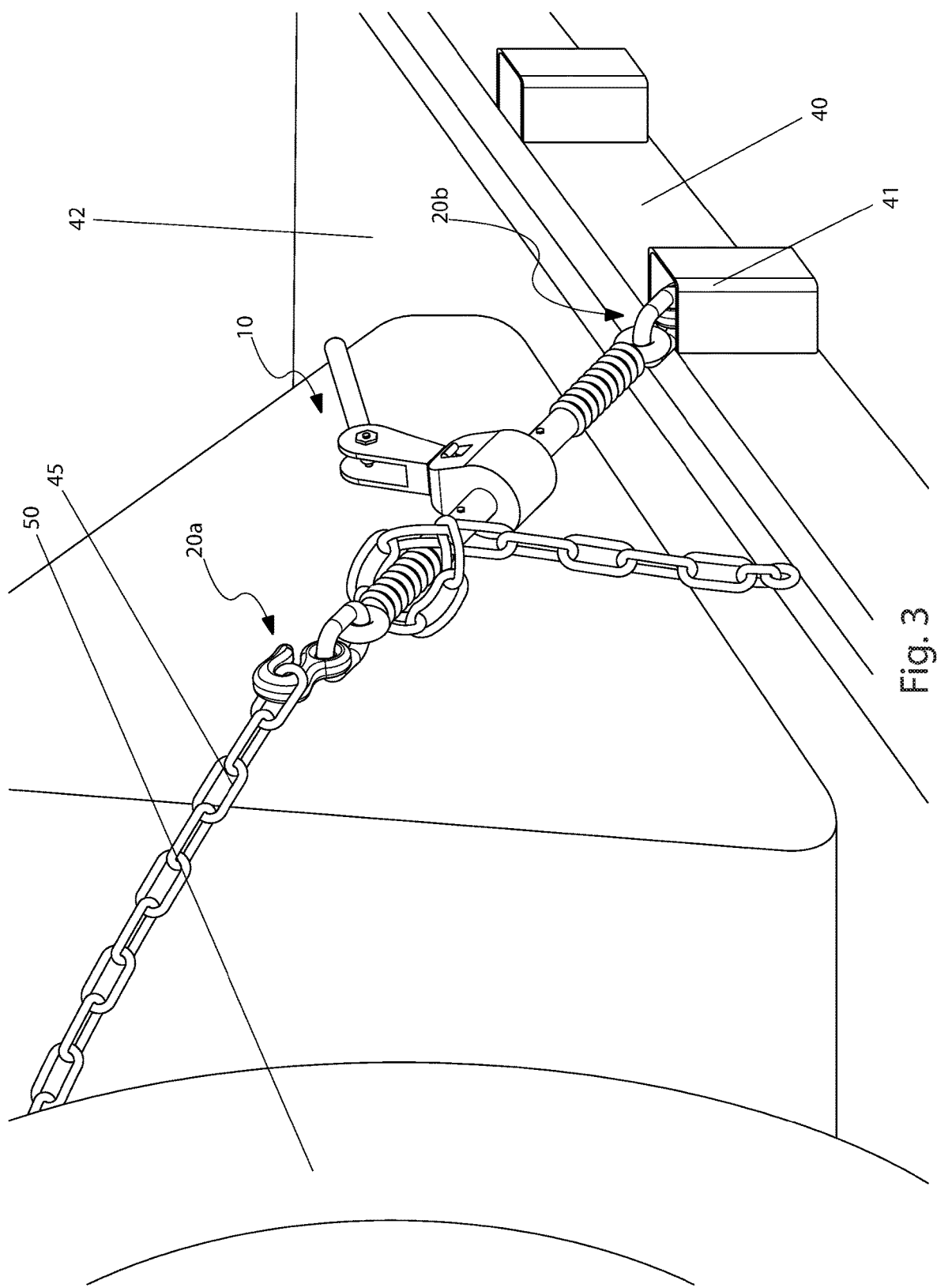

Referring now to FIG. 3, there is depicted an environmental view of a load securing device (herein described as the "device") 10 in an exemplary method of use. The device 10 is particularly suited for securing a load 50 onto a towing vehicle 42, such as a trailer that is not enclosed (e.g., a flatbed or gooseneck trailer), although other vehicles 42 where a load 50 needs to be properly secured can benefit from this invention. The device 10 is capable of secure connection to a chain 45 or similar device that securely wraps around the load 50 to be secured at a first side 20a and is capable of secure connection to a tie-down location 41 (e.g., an eye hook or tow point) on a frame 40 of the towing vehicle 42 at a second side 20b. Thus, the device 10 secures the chain 45 about a load 50 on the towing vehicle 42. It is appreciated that either the first side 20a or second side 20b can engage either the chain 50 or the tie-down location 41 on the towing vehicle.

Referring now to FIGS. 1 and 2, there is depicted a top perspective view of the device in a first configuration (i.e., a resting configuration, FIG. 1) and in a second configuration (i.e., a tensioning configuration, FIG. 2). More specifically, the device 10 has a handle 11 that engages a ratchet device (not shown) to incrementally operably retract a first draw bolt 21a and a second draw bolt 21b towards each other. The ratchet device is housed within an enclosed bearing 16. The first draw bolt 21a has a first end operably connected to a first end of the ratchet device within the bearing 16 and the second draw bolt 21b has a first end operably connected to a second end of the ratchet device within the bearing 16. The first draw bolt 21a and second draw bolt 21b extend away from opposing sides of the bearing 16 and are thus linearly arranged with respect to each other. A first grease fitting 14a is located on the first draw bolt 21a and a second grease fitting 14b is located on the second draw bolt 21b, respectively, to provide enablement of introducing a grease to the bearing 16 to encourage friction-free movement thereof.

The handle 11 is operably connected to a first end of the ratchet device and incrementally actuates the ratchet device so as to simultaneously retract the first draw bolt 21a towards the bearing 16 and to retract the second draw bolt 21b towards the bearing. A yoke 12 is attached to, or an integral part of, the housing of the bearing 16 and is oriented perpendicular to the first draw bolt 21a and second draw bolt 21b. The yoke 12 is generally two (2) coextensive planar elements with a gap in the middle. A handle pivot 17 affixes the plates together and is located at an opposing side of the yoke 12 to the bearing 16. The handle 11 extends outward from in between the two (2) plates of the yoke 12 and is operably attached to the handle pivot 17. The handle pivot 17 is operably attached to the ratchet device in between the two (2) plates of the yoke 12 adjacent the bearing 16 (not shown). The handle 11 is motionable about the handle pivot 17 to operate the ratchet device and is preferably available to be motioned towards either side, relative to the yoke 12, due to how the device 10 is installed.

The first draw bolt 21a extends in and out of the first side of the bearing 16 as actuated by the ratchet device. Attached to the second side of the first draw bolt 21a, opposite the bearing 16, is a first eyebolt 23a. Disposed between the first end of the bearing 16 and the first eyebolt 21a is an articulating first cover 22a. The first cover 22a can be rubber or some other material capable of covering the portion of the first draw bolt 21a that extends out of the first end of the bearing 16 and prevent debris from entering the bearing 16. A first buckle 24a removably attaches a first hook 25a to the first eyebolt 23a. Thus, the first hook 25a and first eyebolt 23a travels with the first draw bolt 21a.

The second draw bolt 21b extends in and out of the second side of the bearing 16 as actuated by the ratchet device. Attached to the second side of the second draw bolt 21b, opposite the bearing 16, is a second eyebolt 23b. Disposed between the second end of the bearing 16 and the second eyebolt 21b is an articulating second cover 22b. The second cover 22b can be rubber or some other material capable of covering the portion of the second draw bolt 21b that extends out of the second end of the bearing 16 and prevent debris from entering the bearing 16. A second buckle 24b removably attaches a second hook 25b to the second eyebolt 23b. Thus, the second hook 25b and second eyebolt 23b travels with the second draw bolt 21b.

The device 10 is preferably manufactured out of a forged metallic material for strength and resiliency. All exposed metallic portions of the device 10 are preferably coated or treated with a protective material to resist rusting and damage from the environment. Such a protective coating can also provide for an enhanced grip when being manipulated. The first cover 22a and second cover 22b can be a resilient synthetic material. The bearing 16 is sealed to prevent rust or binding of the ratchet device with environmental debris such as dust, rocks, or ice.

In a preferred method of use, either the first side 20a or second side 20b is identified as being able to attach to the chain 45 or towing vehicle 42. Once this determination is met, in an exemplary method of use, the first side 20a is identified as attaching to the chain 45. The first draw bolt 21a is extended away from the bearing 16 to a position that the first hook 25a is capable of securing into a link of the chain 45. The second draw bolt 21b is extended away from the bearing 16 to engage a secure connection to a tie-down location 41 of the towing vehicle 42. Then, the handle 11 is motioned in a pivoting manner about the handle pivot 17 to engage the ratchet device. The ratchet device, in an incremental manner, retracts the first draw bolt 21a and second draw bolt 21b towards the bearing 16. Each incremental movement engages the ratchet device to secure the desired position of the first draw bolt 21a, and hence the chain 45, towards the bearing 16 and simultaneously to secure the desired position of the second draw bolt 21b, and hence the device 10, towards the towing vehicle 42. When the chain 45 is extremely taut against the load 50, the handle 11 is left in the desired position, which secures the ratchet device from further movement. Other embodiments provide for a more positive lock for the ratchet device, such as a locking lever 30 on the bearing 16 that positively locks the handle 17 to set the desired position of the draw bolts 21a, 21b relative to the bearing 16. The device 10 can be provided in different sizes and load ratings, according to the desired method of use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A load securing device, comprising:
   a handle;
   a ratchet device incrementally operably retracting a first draw bolt and a second draw bolt towards each other, the ratchet device is also engaged by the handle;
   an enclosed bearing housing the ratchet device;
   a first grease fitting located on the first draw bolt, the first grease fitting provides enablement of introducing a first grease to the bearing to encourage friction-free movement thereof;
   a second grease fitting located on the second draw bolt, the second grease fitting provides enablement of introducing a second grease to the bearing to encourage friction-free movement thereof;
   a yoke attached to the bearing, the yoke oriented perpendicular to the first draw bolt and the second draw bolt;
   a handle pivot affixing a pair of plates together, the handle pivot is located at an opposing side of the yoke to the bearing;
   a first eye bolt attached to the second side of the first draw bolt opposite the bearing;
   an articulating first cover disposed between the first end of the bearing and the first eyebolt;
   an articulating second cover disposed between the second end of the bearing and the second eyebolt;
   a locking lever providing a more positive lock on the bearing that positively locks the handle to set the draw bolts relative to the bearing;
   a first buckle removably attaching a first hook to the first eyebolt, the first hook and the first eyebolt travels with the first draw bolt; and
   a second buckle removably attaching a second hook to the second eyebolt, the second hook and the second eyebolt travels with the second draw bolt;
   wherein the handle is operably connected to a first end of the ratchet device and incrementally actuates the ratchet device so as to simultaneously retract the first draw bolt towards the bearing and to retract the second draw bolt towards the bearing;
   wherein the handle extends outward from in between the pair of plates of the yoke and is operably attached to the handle pivot;
   wherein the handle pivot is operably attached to the ratchet device in between the pair of plates of the yoke adjacent the bearing;
   wherein the yoke is generally two coextensive planar elements with a gap in the middle;
   wherein the first draw bolt is extended away from the bearing to a position that the first hook is secured into a link of a chain;
   wherein the load securing device is securely connected to the chain that securely wraps around the load secured at the first side or the second side of the bearing;
   wherein the handle is motionable about the handle pivot to operate the ratchet device and is available to be motioned towards either side, relative to the yoke, due to how the load securing device is installed;
   wherein the first draw bolt having a first end operably connected to a first end of the ratchet device within the bearing;
   wherein the second draw bolt has a first end operably connected to a second end of the ratchet device within the bearing;
   wherein the first draw bolt and the second draw bolt extend away from opposing sides of the bearing and are linearly arranged with respect to each other;
   wherein the articulating first cover extends out of the first end of the bearing and prevent debris from entering the bearing; and
   wherein the articulating second cover extends out of the second end of the bearing and prevent debris from entering the bearing; and
   wherein the articulating first cover and the articulating second cover are made of a resilient synthetic material.

2. The load securing device according to claim 1, wherein the first draw bolt extends in and out of the first side of the bearing as actuated by the ratchet device.

3. The load securing device according to claim 1, wherein the articulating first cover is made of rubber.

4. The load securing device according to claim 1, wherein the load securing device secures a load onto a towing vehicle.

5. The load securing device according to claim 4, wherein the towing vehicle is a vehicle selected from the group consisting of a trailer that is not enclosed, a flatbed truck, or a gooseneck trailer.

6. The load securing device according to claim 1, wherein the load securing device is manufactured out made out of a forged metallic material for strength and resiliency.

* * * * *